(12) United States Patent
Mori

(10) Patent No.: US 10,365,865 B2
(45) Date of Patent: Jul. 30, 2019

(54) IMAGE FORMING APPARATUS FOR MANAGING OBJECT USED FOR RENDERING, METHOD THEREOF, AND STORAGE MEDIUM

(71) Applicant: CANON KABUSHIKI KAISHA, Tokyo (JP)

(72) Inventor: Hiroshi Mori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/728,398

(22) Filed: Oct. 9, 2017

(65) Prior Publication Data
US 2018/0101337 A1 Apr. 12, 2018

(30) Foreign Application Priority Data
Oct. 12, 2016 (JP) .................................. 2016-201255

(51) Int. Cl.
G06F 3/12 (2006.01)
H04N 1/409 (2006.01)
H04N 1/23 (2006.01)
G06K 15/02 (2006.01)

(52) U.S. Cl.
CPC .......... *G06F 3/1215* (2013.01); *G06F 3/1248* (2013.01); *G06K 15/1838* (2013.01); *H04N 1/233* (2013.01); *G06K 15/1813* (2013.01); *G06K 15/1836* (2013.01); *G06K 2215/0068* (2013.01); *H04N 1/409* (2013.01); *H04N 1/4092* (2013.01); *H04N 2201/0094* (2013.01)

(58) Field of Classification Search
CPC . G06F 3/1215; G06F 3/1248; G06K 15/1813; G06K 15/1836; G06K 2215/0068; H04N 1/233; H04N 1/409; H04N 2201/0094
USPC .................................. 358/1.15, 474.442, 443
See application file for complete search history.

(56) References Cited

U.S. PATENT DOCUMENTS

| | | | | |
|---|---|---|---|---|
| 6,088,027 A | * | 7/2000 | Konar | ................. G06F 3/04812 715/858 |
| 9,633,436 B2 | * | 4/2017 | Pisipati | ..................... G06T 7/13 |
| 9,848,098 B2 | * | 12/2017 | Mita | .................. H04N 1/00748 |
| 2004/0085443 A1 | * | 5/2004 | Kallioniemi | ............. G01N 1/36 348/135 |
| 2005/0007372 A1 | * | 1/2005 | Ecob | ....................... G06T 11/40 345/473 |

(Continued)

FOREIGN PATENT DOCUMENTS

JP 2003216960 A 7/2003

*Primary Examiner* — Negussie Worku
(74) *Attorney, Agent, or Firm* — Canon U.S.A., Inc. IP Division

(57) ABSTRACT

An image forming apparatus draws line by line an object included in a page. The image forming apparatus includes a sorting unit configured to sort edges of the object included on process target lines in ascending order of coordinates by comparing the coordinates of edges and a drawing unit configured to perform drawing between the edges based on the edges arranged by the sorting unit. The sorting unit compares coordinates to sort other edges on the process target lines with respect to the plurality of edges on the process target lines, which are already sorted, starting with a comparison with the coordinate of one of the plurality of edges specified based on the coordinates of the other edges.

14 Claims, 13 Drawing Sheets

(56) References Cited

U.S. PATENT DOCUMENTS

| | | | |
|---|---|---|---|
| 2005/0052455 A1* | 3/2005 | Long | G06T 11/40 345/422 |
| 2009/0169110 A1* | 7/2009 | Masuyama | G06F 17/30613 382/198 |
| 2010/0271646 A1* | 10/2010 | Morimoto | G03G 15/5025 358/1.9 |
| 2013/0286044 A1* | 10/2013 | Puckett | G06T 11/00 345/619 |
| 2013/0342873 A1* | 12/2013 | Mori | H04N 1/21 358/1.16 |
| 2016/0012611 A1* | 1/2016 | Wexler | G06T 7/602 382/103 |
| 2016/0352963 A1* | 12/2016 | Nagai | H04N 1/3871 |
| 2017/0154204 A1* | 6/2017 | Ryu | G06K 9/00208 |
| 2017/0216385 A1* | 8/2017 | Fukada | A61K 36/23 |
| 2018/0173860 A1* | 6/2018 | Mori | G05B 19/0423 |

* cited by examiner

FIG. 4

EDGE BLOCK TABLE 221

| DIVIDED AREA ID | EDGE ID |
|---|---|
| 1 | EDGE ID = 6 |
| 2 | EDGE ID = 4 |
| 3 | EDGE ID = 1 |
| 4 | NONE |
| 5 | EDGE ID = 2 |

EDGE TABLE 222

| EDGE ID | EDGE Info | |
|---|---|---|
| 1 | Current_X | DX/DY |
| | prev_edge_id | next_edge_id |
| 2 | Current_X | DX/DY |
| | prev_edge_id | next_edge_id |
| ... | ... | |
| n | Current_X | DX/DY |
| | prev_edge_id | next_edge_id |

FIG. 12

EDGE BLOCK TABLE 1 (223)

| DIVIDED AREA ID | EDGE ID |
|---|---|
| 1 | EDGE ID = 6 |
| 2 | EDGE ID = 4 |
| 3 | EDGE ID = 1 |
| 4 | NONE |
| 5 | EDGE ID = 2 |

EDGE BLOCK TABLE 2 (224)

| COORDINATE ID | EDGE ID |
|---|---|
| 1 | ..... |
| 2 | ..... |
| 120 | EDGE ID = 5 |
| 240 | EDGE ID = 6 |
| 360 | EDGE ID = 3 |
| 480 | EDGE ID = 4 |
| 600 | EDGE ID = 1 |
| 1200 | EDGE ID = 2 |

EDGE TABLE (222)

| EDGE ID | EDGE INFO | |
|---|---|---|
| 1 | Current_X | DX/DY |
|   | prev_addr | next_addr |
| 2 | Current_X | DX/DY |
|   | prev_addr | next_addr |
| ... | | |
| n | Current_X | DX/DY |
|   | prev_addr | next_addr |

IMAGE FORMING APPARATUS FOR MANAGING OBJECT USED FOR RENDERING, METHOD THEREOF, AND STORAGE MEDIUM

BACKGROUND

Field of the Disclosure

The present disclosure relates to an image forming apparatus, a method, and a program. Particularly, the present disclosure relates to an edge process of a drawing object in an image forming process.

Description of the Related Art

There are various methods for drawing a drawing object (hereinafter, referred to as an object) included in a page. Japanese Patent Laid-Open No. 2003-216960 discloses a method for drawing an object line by line in a page and generating a bit map image of the page. In this method, coordinates of edges of the object, which appears on the process target lines, are arranged in ascending order. Then, an object that contributes coloring between the respective edges (a color of each pixel between the edges) is specified, and the color determined based on the coloring of the specified object is set as the color of each pixel between the edges.

The process to arrange the edges (an edge sorting process) calculates a coordinate of the edge on the line for each edge, determines the size relation of the coordinates by comparing the coordinates of the edges, and arranges the respective edges so that the coordinates become in ascending order. For example, in the edge sorting process for adding a single edge in other plural edges already arranged in ascending order, a comparison of a coordinate of the single edge and coordinates of the other edges is performed starting with an edge having a smallest coordinate among the other plural edges in order.

However, according to the conventional edge sorting process, in a case that there are a large number of objects on the lines, the number of repetition of comparing the coordinates of the edges becomes large and an immense amount of time is needed for the edge sorting process. For example, it is considered a case that, when an edge having a largest coordinate is added, the edge coordinates are compared starting with the edge having the smallest coordinate among the other edges, which are already arranged, in order. In this case, the coordinate of the edge to be added is compared with the coordinates of all of the other edges and this causes an immense amount of time for the edge sorting process, compared to a case of being compared with only a part of the coordinates of the other edges.

SUMMARY

An aspect of the present disclosure is to provide an image forming apparatus that can suppress an increase time for an edge sorting process.

Another aspect of the present disclosure is an image forming apparatus that draws line by line an object included in a page. The image forming apparatus includes a sorting unit configured to sort edges of the object included on process target lines in ascending order of coordinates by comparing the coordinates of edges and a drawing unit configured to perform drawing between the edges based on the edges arranged by the sorting unit. The sorting unit compares coordinates to sort other edges on the process target lines with respect to the plurality of edges on the process target lines, which are already sorted, starting with a comparison with the coordinate of one of the plurality of edges specified based on the coordinates of the other edges.

Further features of the present disclosure will become apparent from the following description of exemplary embodiments (with reference to the attached drawings).

BRIEF DESCRIPTION OF THE DRAWINGS

FIG. 4 is conceptual diagram of an edge block table and an edge table according to one or more aspects of the present disclosure.

FIG. 12 is a conceptual diagram of edge block tables 1 and 2 and an edge table according to one or more aspects of the present disclosure.

DESCRIPTION OF THE EMBODIMENTS

First Embodiment

An example of a system configuration according to one or more aspects of the present disclosure is illustrated. This system has a configuration that a host computer (a personal computer or a server computer) and an image forming apparatus (an apparatus having a printing function or a printer) 110 are connected via LAN.

A user firstly generates, in the host computer, print data (PDL data) written in a page description language (PDL) that indicates page information to be printed and transfers the data to the image forming apparatus 110. The image forming apparatus 110 performs a print process based on the transferred PDL data. This image forming apparatus may be any of printers including a multi function peripheral (MFP) and a single function printer (SFP). Further, the image processing apparatus may be a printer other than the MFP or SFP.

Figure 1:
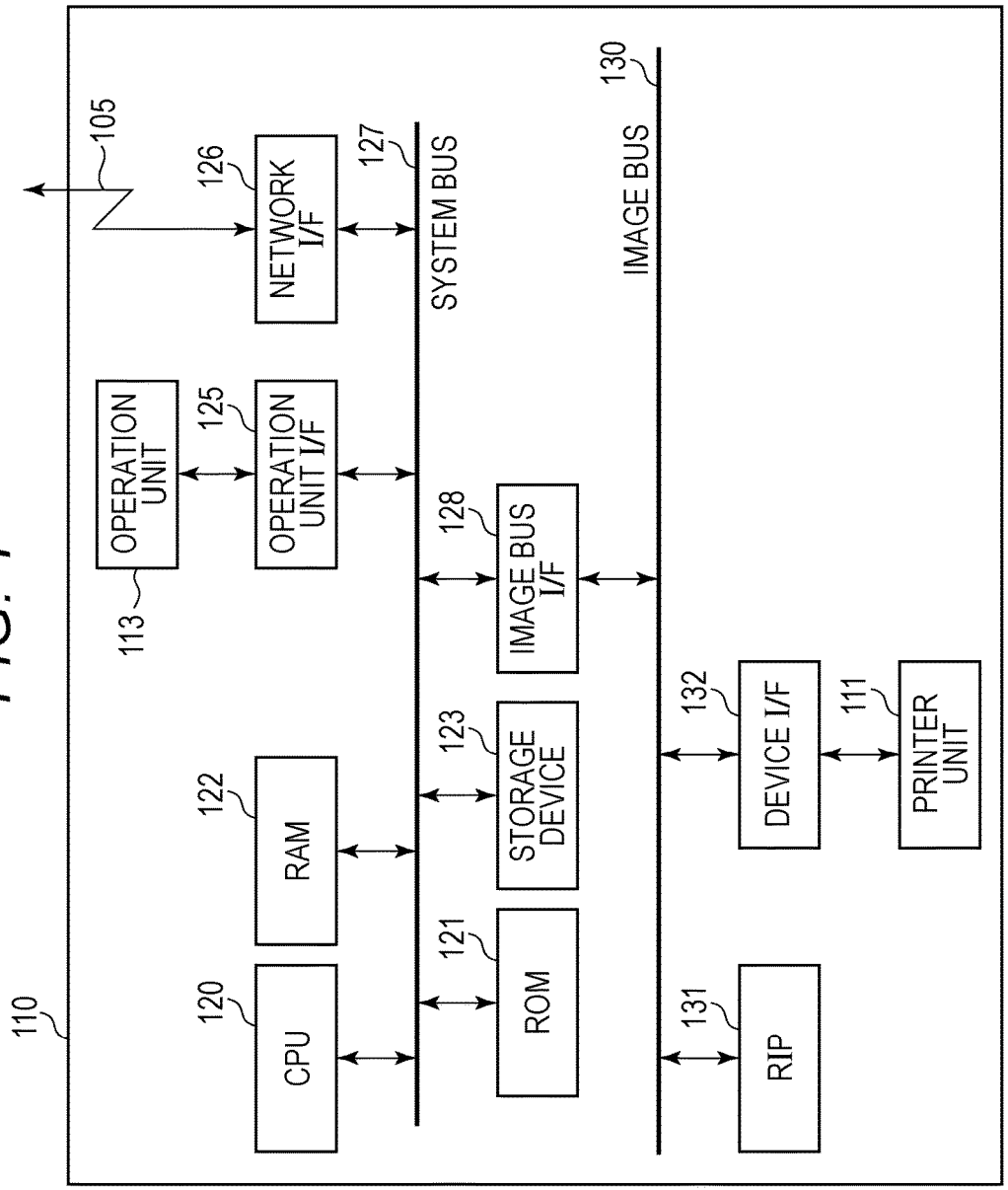
FIG. 1 is a diagram illustrating a hardware configuration of an image forming apparatus according to one or more aspects of the present disclosure.

With reference to FIG. 1, a hardware configuration of the image forming apparatus 110 according to one or more aspects of the present disclosure will be described in detail. In FIG. 1, the image forming apparatus 110 includes a printer unit 111, which serves as an image output device. The printer unit 111 may have any method, such as an electrophotographic method and an inkjet method, which allows an image to be printed on a sheet. Further, the image forming apparatus 110 is connected to the LAN and controls to input or output PDL data or device information via the LAN. The printer unit 111 is connected to a device I/F 132 and performs a process to print an image on a sheet such as a sheet of paper based on image data generated in image forming apparatus 110. A CPU 120 is a central processing unit for controlling the entire image forming apparatus. The CPU 120 may be a single-core CPU or a multi-core CPU, which is composed of one or more processors. A RAM 122 is a system work memory used by the CPU 120 to operate. For example, the RAM 122 is used as a work memory when the CPU 120 converts PDL data into intermediate data (a display list). The converted intermediate data is temporarily stored in the RAM 122. A ROM 121 is a boot ROM and stores a system boot program. A storage device 123 is a hard disk drive and has a configuration to store system software for various processes and transmitted PDL data or bitmap data.

An operation unit I/F 125 is an interface unit for an operation unit 113, which has a display screen to display various menus, print data information, or the like, and outputs operating screen data to the operation unit 113. Further, the operation unit I/F 125 serves to transmit data, which is input by the operator via the operation unit 113, to the CPU 120. A network I/F 126 connects to the LAN and inputs and outputs information to and from an external device. The above described units are provided being connected to a system bus 127. An image bus I/F 128 is an interface to connect to an image bus 130, which transfers image data to the system bus 127 at high speeds and is a bus bridge for converting data structures.

To the image bus 130, a raster image processor (RIP) 131 and a device I/F 132 are connected. The RIP 131 generates bitmap data by performing an image forming process (a rendering process) illustrated in FIG. 3 based on the intermediate data (the display list) converted from PDL data by the CPU 120. The RIP 131 may be realized by software or hardware. In other words, the RIP 131 may be composed of one or more processors, may be composed of an electronic circuit such as ASIC, or may be composed of a combination of a processor and an electronic circuit. According to the present embodiment, the RIP 131 is operated by reading a software program stored in an unillustrated memory in the RIP 131 by one or more processor. The device I/F 132 connects the printer unit 111 and the image forming apparatus 110 and performs a synchronous/asynchronous conversion of image data.

<Software Configuration of Image Forming Apparatus>

Figure 2:
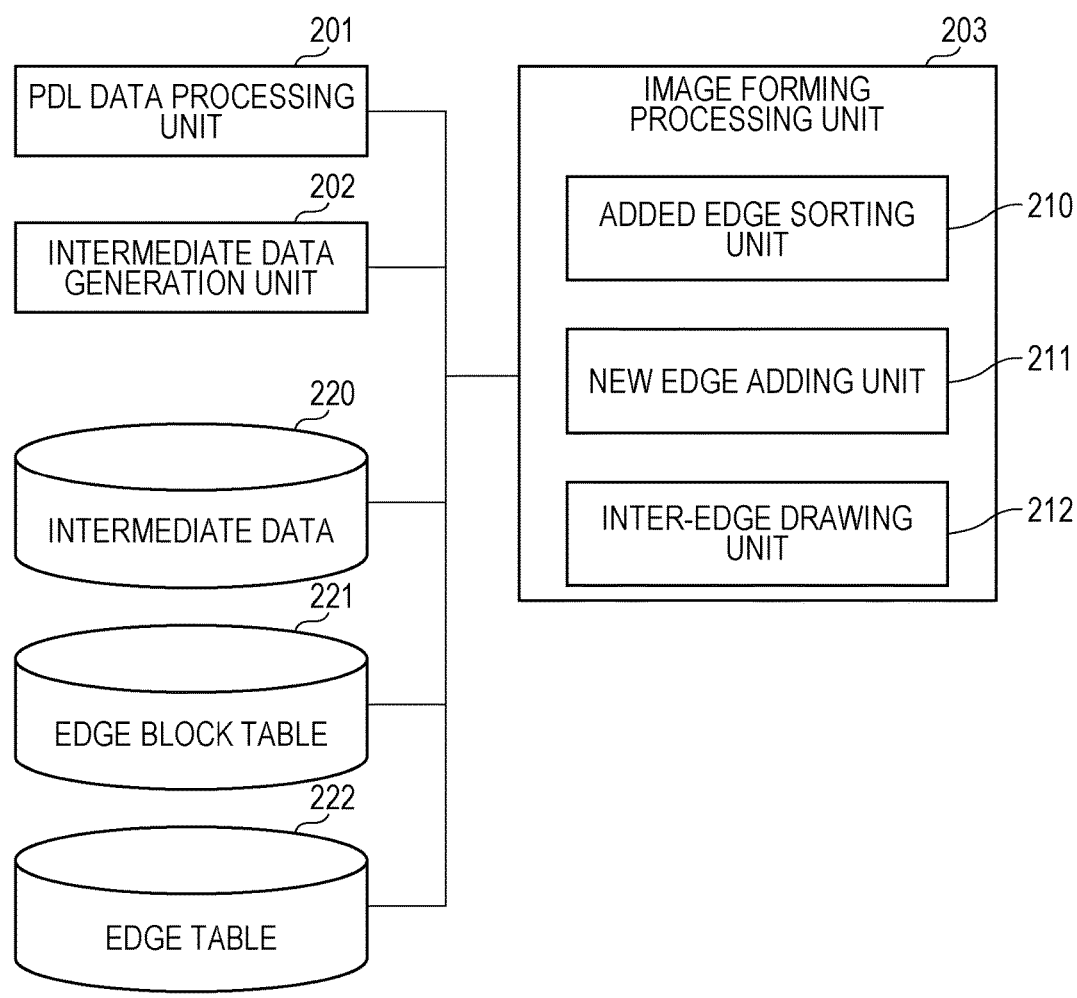
FIG. 2 is a diagram illustrating a software configuration of the image forming apparatus according to one or more aspects of the present disclosure.

FIG. 2 is a diagram illustrating a software configuration of the image forming apparatus 110 according to one or more aspects of the disclosure.

A PDL data processing unit (201) acquires information of an object included in a page by interpreting PDL data received by the network I/F 126 and performs a process to transfer the acquired image of the object to an intermediate data generation unit. The intermediate data generation unit (202) generates intermediate data (220) used in the image forming process (the rendering process) based on the object information transferred from the PDL data processing unit (201). The intermediate data includes information indicating an outline shape (an edge) of an object. To each edge, coloring of the object corresponding to the edge (for example, a color or a bit map) is associated. In the intermediate data, for example, a red rectangular object is expressed with right and left edges of the rectangle and information that is associated with those edges and indicates the area between the edges are colored in red. Further, each edge included in the intermediate data has information of a position in the page. The intermediate data (220) is temporarily stored in the RAM 122. Here, the PDL data processing unit (201) and intermediate data generation unit (202) are realized by reading and executing a program stored in the ROM 121 by the CPU 120.

An image forming processing unit (203) generates bitmap data of each page based on the intermediate data (220). The image forming processing unit (203) includes respective units (210 to 212) needed to form an image, as illustrated in FIG. 2. The respective units may be different processors that execute corresponding programs or a single processor or may be realized by a single electronic circuit or a combination of an electronic circuit and a processor. Here, the following added edge sorting unit (210) and new edge adding unit (211) may be referred to as a sorting unit.

When an image forming process of a process target line (hereinafter, referred to as a scan line) in a page is performed, the added edge sorting unit (210) calculates, based on the intermediate data (220), a coordinate of an edge of the object that appears on the process target scan line continuously from a previous scan line. Then, the edges on the scan lines are sorted so that the coordinates of the edges are arranged in ascending order. The respective edges are managed in an edge table (222) and sequentially updated by a sorting process.

When the image forming process for the process target scan line is performed, the new edge adding unit (211) specifies an edge of the object which is not appeared on the previous scan line and newly appears on the process target scan line, based on the intermediate data (220), and calculates a coordinate. Then, the new edge adding unit (211) adds the new edge to the edges managed in the edge table (222) so that the coordinates are arranged in ascending order, based on the coordinate of the new edge.

Here, the sorting process performed by the above described added edge sorting unit (210) and new edge adding unit (211) by using a later described edge block table (221) is one of the characteristics of the present embodiment. The details of the sorting process will be described later.

An inter-edge drawing unit (212) draws, in the process target scan line, each object based on information of the edges managed in the edge table (222). According to the present embodiment, the inter-edge drawing unit (212) refers to the respective edges managed in the edge table (222), in which the coordinates of the process target scan line are arranged in ascending order, and the area between the respective edges are all colored. Specifically, the color between the edges is determined based on the information of colors associated with the respective edges and a drawing process of the process target scan line by fully coloring the area between the edges with the color. This is a drawing process on an area between the edges. This inter-edge drawing process may be a known method.

The edge block table (221) and edge table (222), which are characteristics of the present embodiment, will be described next with reference to FIGS. 4 and 5.

<Conceptual Diagram of Edge Block Table (221) and Edge Table (222)>

The edge table (222) is information as illustrated in FIG. 4. In other words, the edges of the object appear on the process target scan lines are managed with edge IDs, and the respective edges indicated by the edge IDs include following information (edge Info). This information allocates a coordinate (X coordinate) (Current_X) of the edge on the scan line and an inclination (DX/DY) of the edge and includes edge IDs (prev_edge_id, next_edge_id) which are located in front and back positions on the X coordinate. Here, the X coordinate of the edge is a coordinate on the process target scan line and the inclination of the edge is information that indicates how much the coordinate of the edge shifts in an X direction when the process target scan line is switched to a subsequent scan line. With this information, the edges of each object appear on the process target scan line are managed as being associated with one another (being linked to one another) so as to be in ascending order of the X coordinates. For example, in a case that prev_edge_id of the edge ID 1 is 4, and next_edge_id is 2, three edges (edges 1, 2, and 4) having the edge IDs 1, 2, and 4 are assumed to be linked in ascending order of the X coordinates in order of the edge 4, edge 1, and edge 2. In this manner, the state that a plurality of edges are linked to one another in ascending order with the X coordinates can be referred to as a state that the plurality of edges are being sorted in ascending order with the X coordinates. Here, in the edge table (222), when a new object appears on the process target line, the new edge adding unit (211) adds an edge corresponding to the object with a new ID applied.

Further, the edge block table (221) is information as illustrated in FIG. 4. In other words, regarding each area (zone) in a case that a page is divided into a plurality of blocks (areas or zones) in a predetermined size, information (edge ID) that specifies edges of coordinates corresponding to the positions of the respective divided areas can be stored in the edge block table. It means that the edge block table (221) serves as a role to associate each divided area with the edge (edge ID) included in the divided area. For example, in a case that the page area is divided into respective divided areas, which are the divided areas 1, 2, 3, 4, and 5 from the left to the right in order, the edge block table (221) illustrated in FIG. 4 specifies an edge 6 as an edge included in the divided area 1. Similarly, for the divided areas 2, 3, and 5, the edges 4, 1, and 2 are specified, respectively. Here, regarding the divided area 4, there is no edge included, it is specified as none (Null). Here, according to the present embodiment, a single edge ID is associated with a single divided area; however, more than one edge IDs may be associated with a single divided area.

Figure 5:
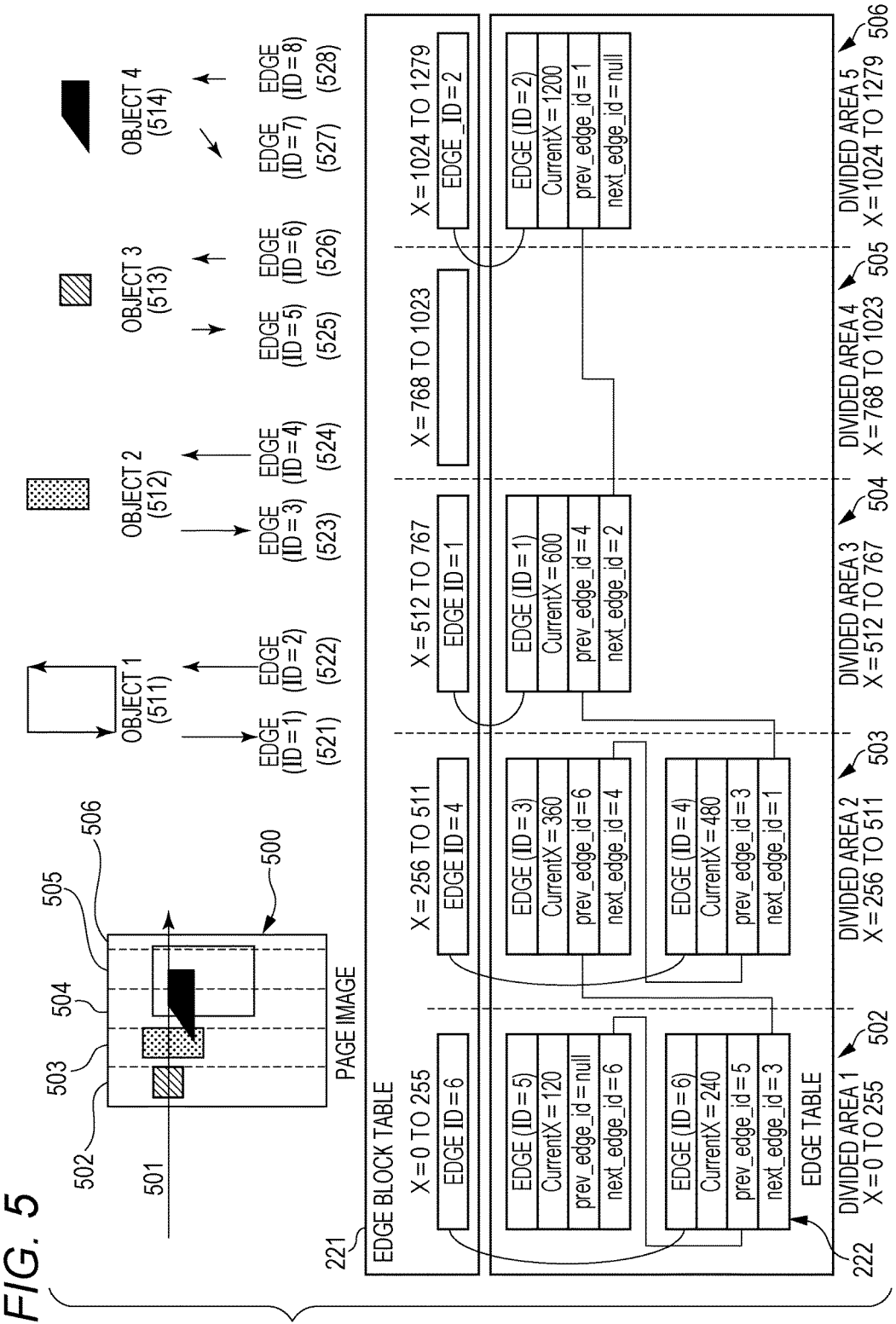
FIG. 5 is a conceptual diagram of the edge block table at timing of a predetermined line according to one or more aspects of the present disclosure.

FIG. 5 is a conceptual diagram illustrating a state of the edge block table (221) in a case that a process target line (501) of the page image (500) is processed. For example, when the page divided size is set as 256 pixels (in a plural-pixel unit), the page image (500) illustrated in FIG. 5 is divided into divided areas 1 to 5 (502 to 506). The divided area 1 corresponds to a region of the coordinates 0 to 255 and edges having coordinates in this range are associated. The edge block table (221) maintains the associating information. Similarly, the respective divided areas 2, 3, 4 and 5 correspond to ranges of the coordinates 256 to 511, 512 to 767, 768 to 1023, and 1024 to 1279, respectively. Thus, in the edge block table (221), to the respective divided areas, the edges having coordinates in the corresponding ranges are associated.

The page image (500) illustrated in FIG. 5 includes objects 1 to 4 (511 to 514). The respective objects are indicated by edges (IDs=1 to 8) (521 to 528) in the intermediate data. In this case, the edges (525) and (526) having the edge IDs 5 and 6 are included in the divided area 1 (502) and managed in a link structure so as to be in ascending order with the coordinates on the scan line as illustrated in the edge table (222) of FIG. 5. Then, in the edge block table (221) for the divided area 1 (502), data is stored as being associated with the edge (526) having the edge ID=6.

As a rule for associating an edge to each divided area in the edge block table (221) according to the present embodiment, an ID of an edge which is lastly accessed (to which a sorting process is performed) in each divided area is stored. The same process is performed for the divided areas 2, 3, 4, and 5. Here, as another embodiment, not the lastly accessed edge ID, but an ID of an edge having a smallest coordinate among the edges included in each divided area (that is, the leftmost edge in the divided area) may be stored. In this case, in the example of FIG. 5, the edges associated to the divided areas 1, 2, 3, and 5 are the edge ID 5, 3, 1, and 2, respectively.

The above described edge block table (221) and edge table (222) are stored in an unillustrated memory in the RIP 131 and used in the edge sorting process by the added edge sorting unit (210) and new edge adding unit (211) in the RIP 131.

<Details of Print Process and Rendering Process of Transferred PDL Data in Image Forming Apparatus>

A series of print processes of PDL data transmitted by the user, which are executed by the CPU 120, in the image forming apparatus 110 according to the present embodiment will be described. Firstly, the CPU 120 loads a program to execute from the ROM 121 to the RAM 122. With this configuration, the image forming apparatus 110 controls the CPU 120 to execute the series of the PDL data print processes. Firstly, the CPU 120 stores PDL data received from the host computer to the storage device 123. Next, the CPU 120 analyzes the transmitted PDL data. Next, the CPU 120 generates intermediate data (220) needed to generate a bit map image based on analysis information of the analyzed PDL data. Next, the CPU 120 performs an image forming process (a rendering process) based on the generated intermediate data (220) and generates bitmap data that shows a page image.

Figure 3:
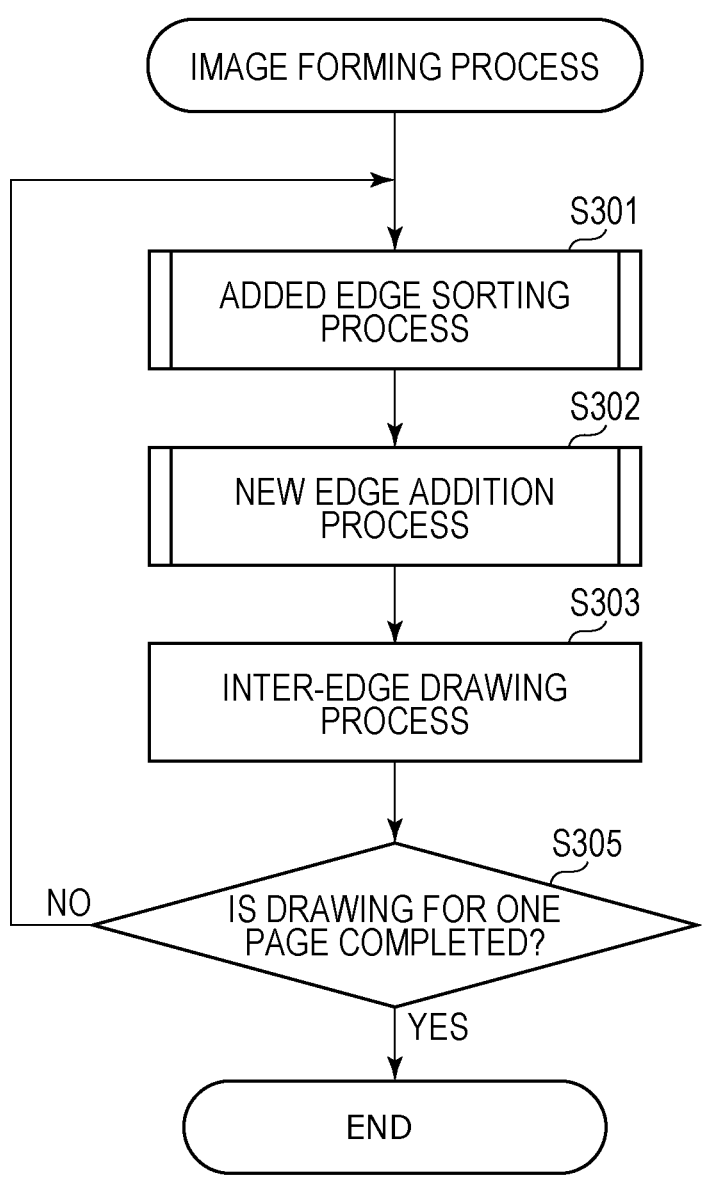
FIG. 3 is a diagram illustrating a detailed flow of an image forming process according to one or more aspects of the present disclosure.

FIG. 3 is a diagram illustrating a detailed flow of the image forming process (rendering process) performed by the RIP (131) according to one or more aspects of the present disclosure. The processes S301 to S305 in this flowchart are repeated for every process target scan line.

Figure 10:
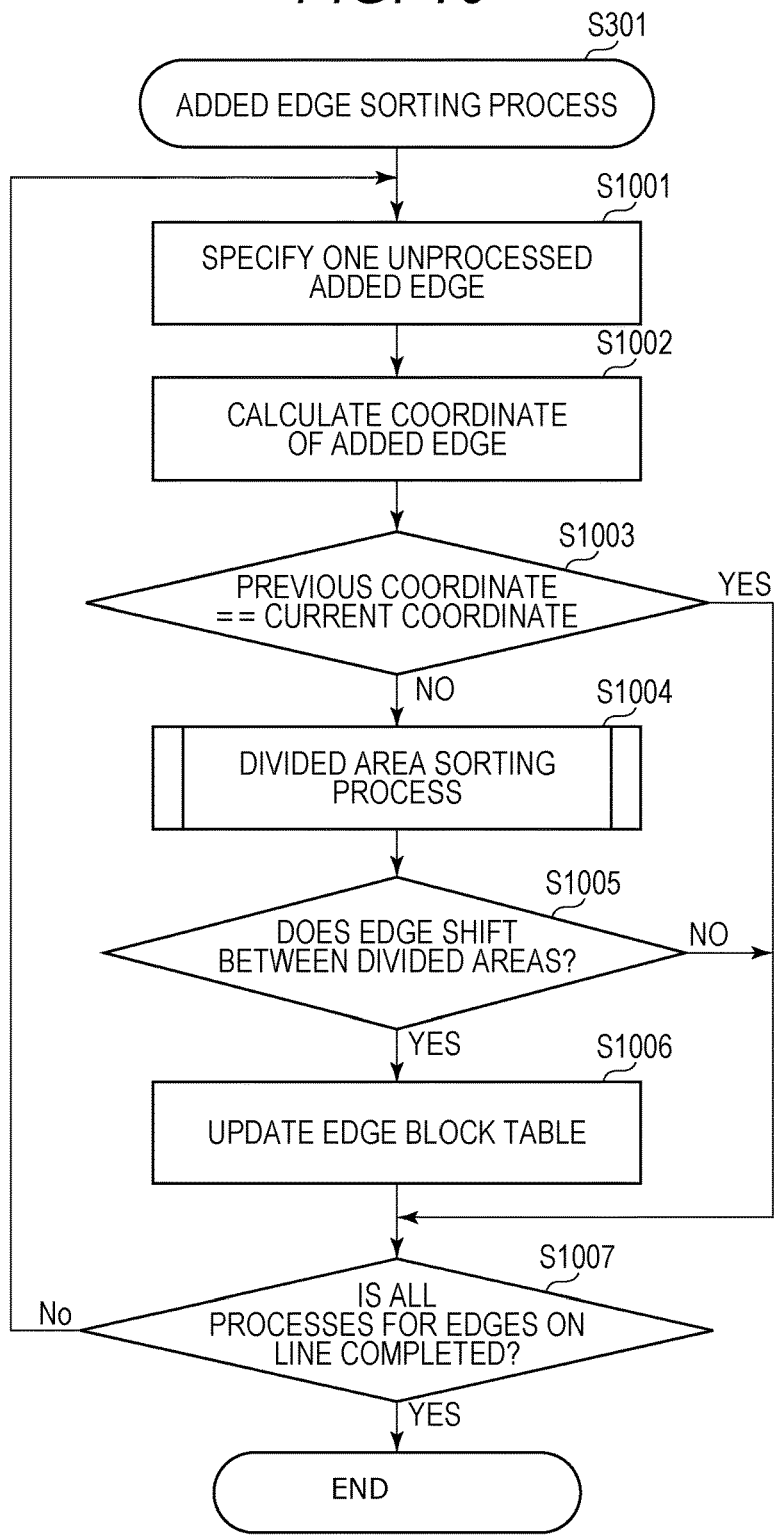
FIG. 10 is a diagram illustrating a detailed flow of an added edge sorting process according to one or more aspects of the present disclosure.

In S301, the added edge sorting unit (210) of the RIP (131) performs an added edge sorting process illustrated in FIG. 10 by using information in the edge block table (221) and edge table (222). The added edge sorting process is a process to rearrange the edges, which appear continuously from a previous scan line (which are edges already managed in the edge table (222)) in ascending order with the coordinates.

Figure 6:
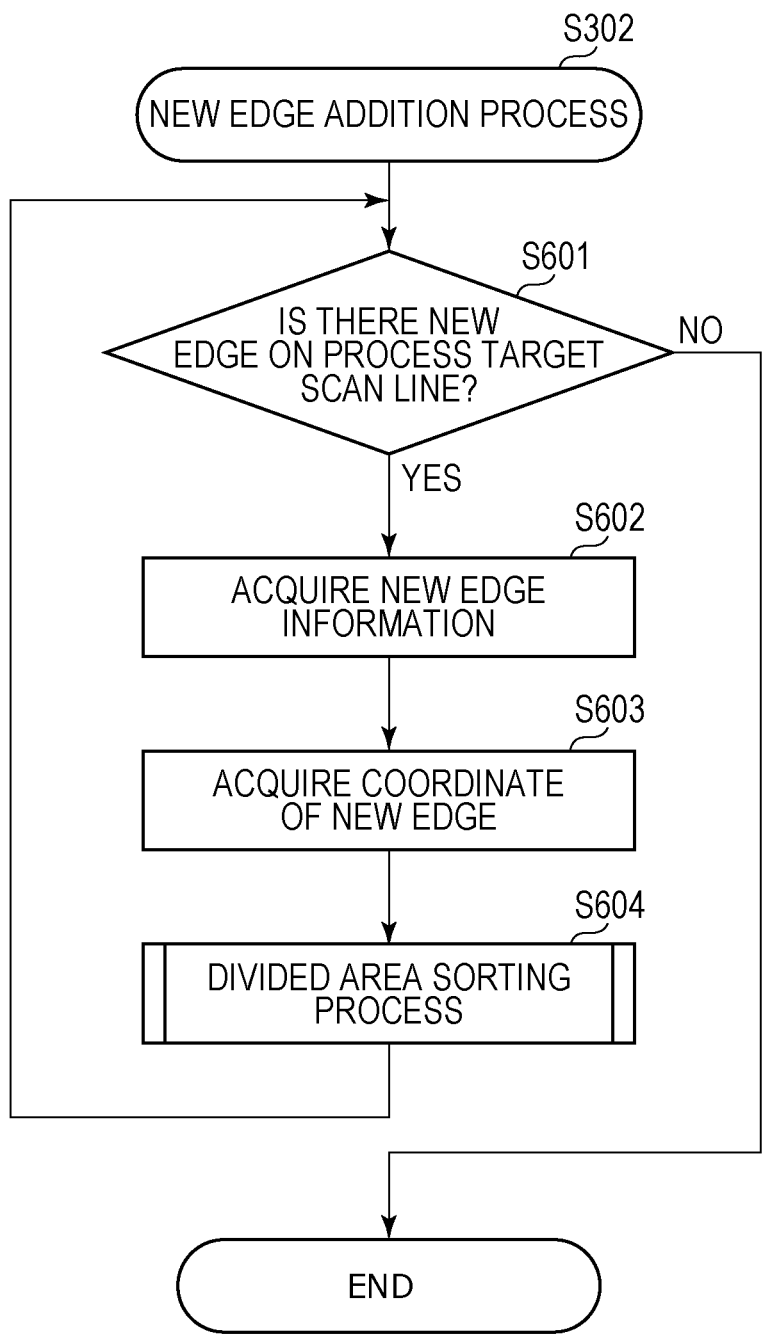
FIG. 6 is a diagram illustrating a detailed flow of a new edge addition process according to one or more aspects of the present disclosure.

Next, in S302, the new edge adding unit (211) of the RIP (131) performs a new edge addition process illustrated in FIG. 6 by using information in the intermediate data (220), edge block table (221), and edge table (222).

Next, in S303, the inter-edge drawing unit (212) of the RIP (131) performs the above described inter-edge drawing process.

Next, in S305, the inter-edge drawing unit (212) of the RIP (131) determines whether the inter-edge drawing process is performed for all scan lines in the page and ends the process of this flowchart when the processes for all the scan lines have been completed (Yes in S305). When the processes have not finished (No in S305), the inter-edge drawing unit (212) controls the added edge sorting unit (210) and new edge adding unit (211) to perform each process on a subsequent scan line as a processing target. In this manner, the image forming process according to the present embodiment draws the object included in the page line by line (in a unit of line).

<Details of New Edge Addition Process (S302)>

FIG. 6 is a diagram illustrating a detailed flow of the new edge addition process (S302) illustrated in FIG. 3 according to one or more aspects of the present disclosure. In this process, the edge of the object that appears on the process target scan line is specified by referring to the intermediate data (200), and adds the edge to the edge table (222) so as to be in ascending order with the coordinates.

Firstly, in S601, the new edge adding unit (211) determines whether or not there is a new edge to be added on the process target scan line of the by referring to the intermediate data. When it is determined that there is a new edge, the process proceeds to S602. Further, when it is determined that there is no new edge, this flow is ended.

In S602, the new edge adding unit (211) acquires position information of the new edge from the intermediate data (220). This position information is a beginning X coordinate of the edge which is newly added and DX/DY that indicates inclination information of each edge. Then, the new edge adding unit (211) stores the stored beginning X coordinate of the edge and the DX/DY indicating the inclination information of each edge in the edge table (222) according to the corresponding edge ID. Here, the start X coordinate is stored in Current_X.

Next, in S603, the new edge adding unit (211) acquires the coordinate of the new edge on the processing target scan line from the Current_X in the edge table (222).

Figure 7:
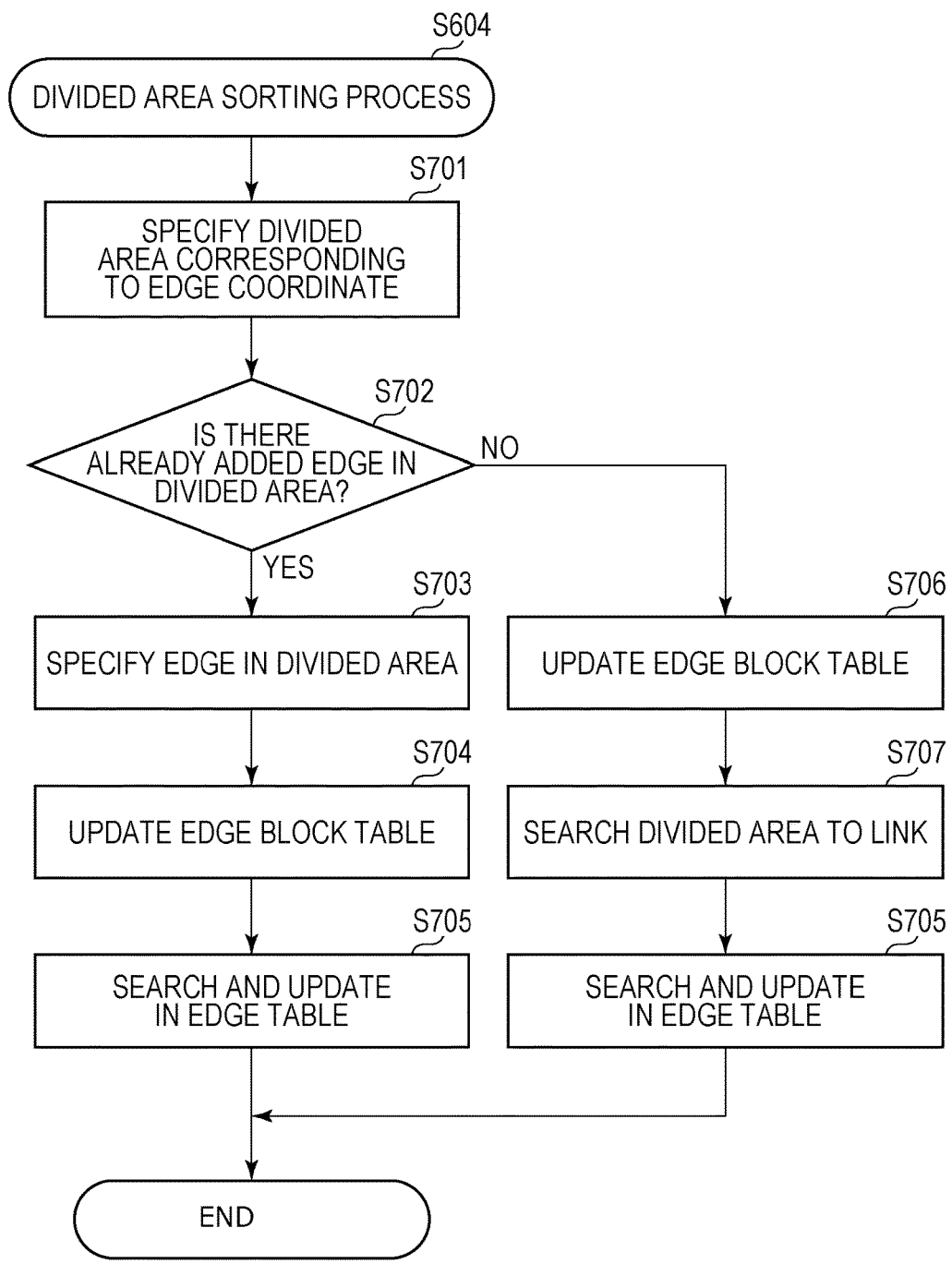
FIG. 7 is a diagram illustrating a detailed flow of a divided area sorting process according to one or more aspects of the present disclosure.

Next, in S604, the new edge adding unit (211) performs a divided area sorting process illustrated in FIG. 7 by using the acquired coordinate value and the edge block table (221).

Then, the process returns to S601.

<Details of Divided Area Sorting Process (S604)>

Figure 8:
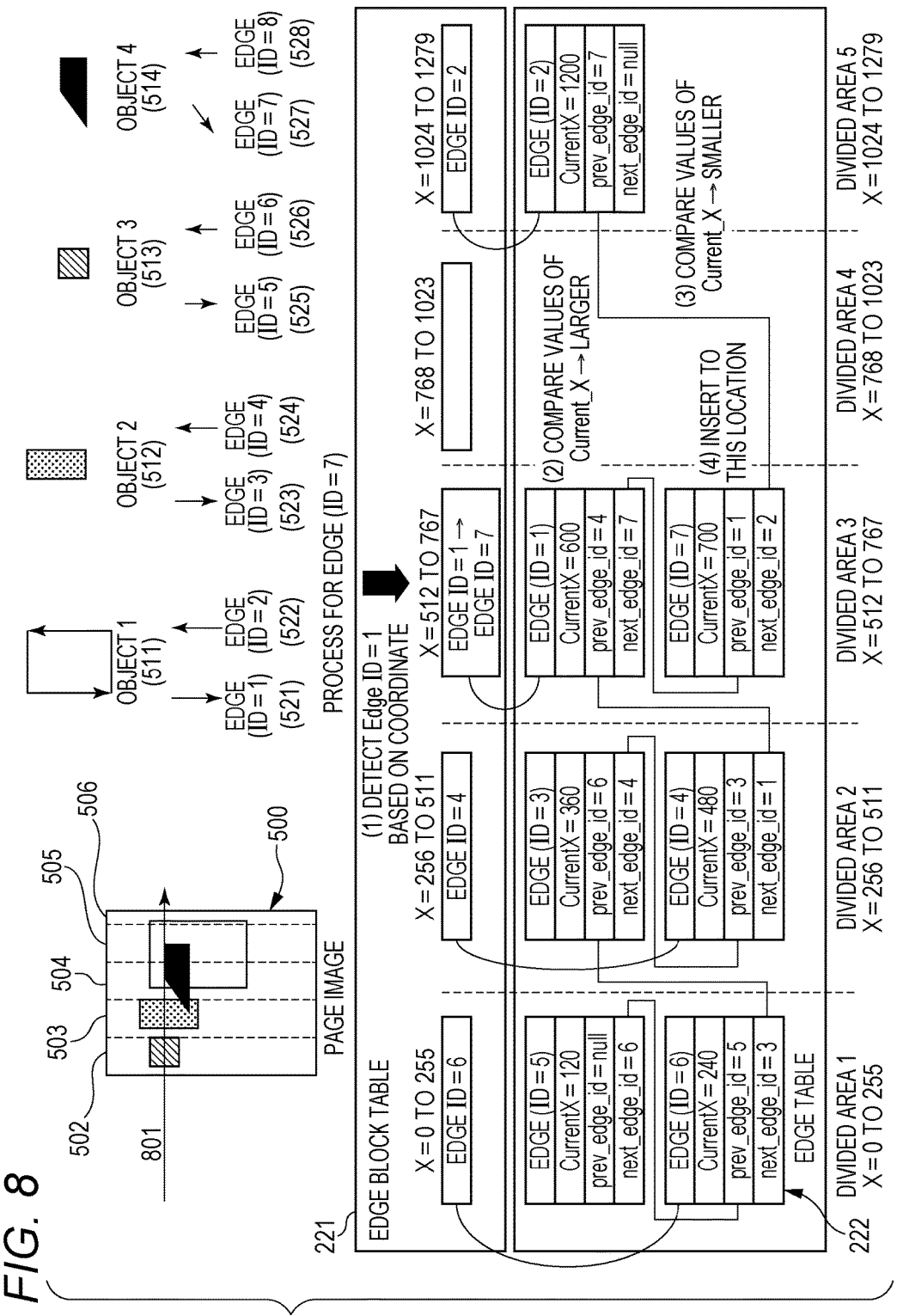
FIG. 8 is an explanatory view of the divided area sorting process, in which the edge block table is used according to one or more aspects of the present disclosure.
Figure 9:
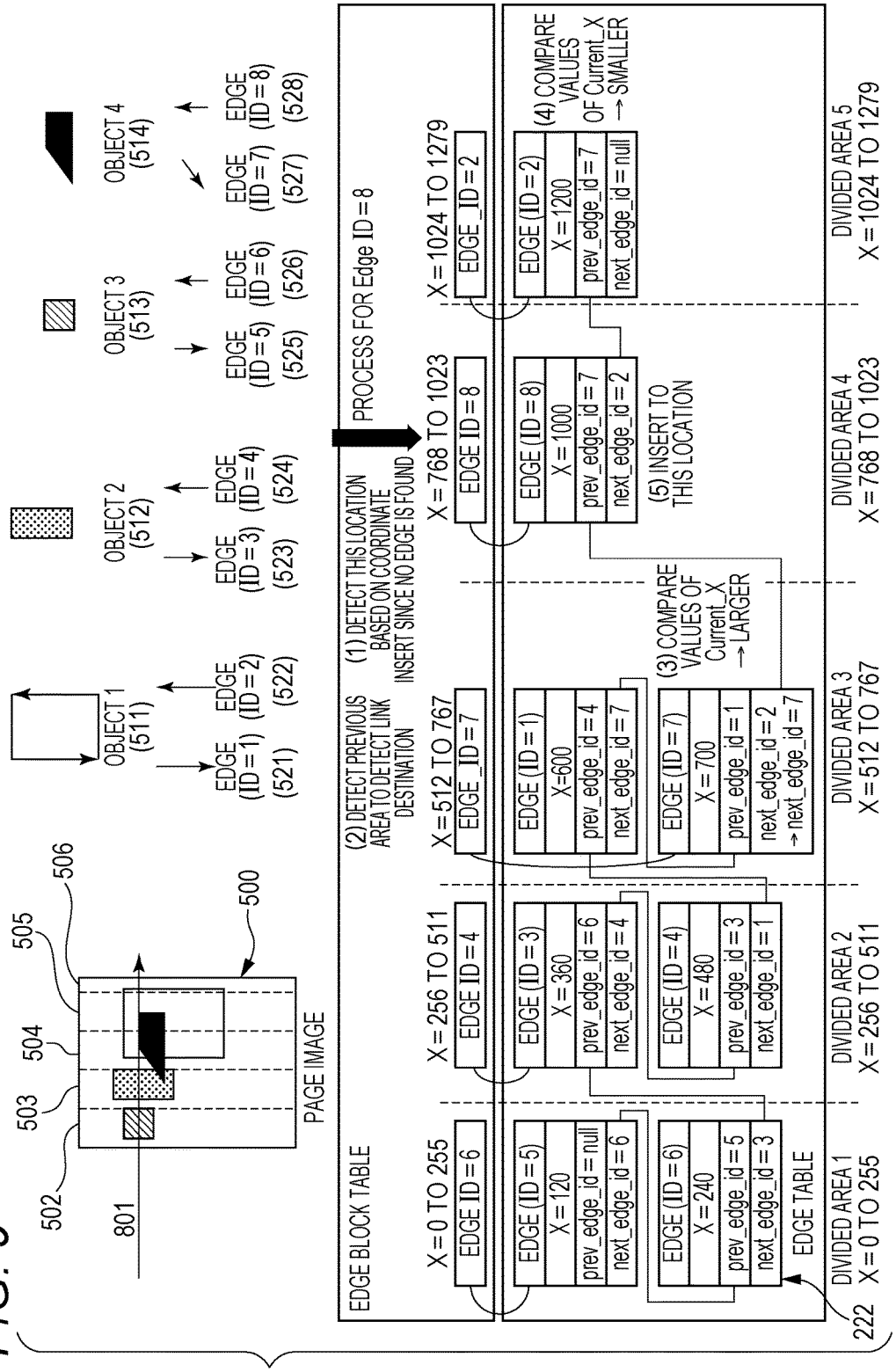
FIG. 9 is an explanatory view of the divided area sorting process, in which the edge block table is used according to one or more aspects of the present disclosure.

FIG. 7 is a diagram illustrating a detailed flow of the divided area sorting process (S604) illustrated in FIG. 6 according to one or more aspects of the present disclosure. Further, FIGS. 8 and 9 are diagrams for explaining the divided area sorting process (S604) in which the edge block table (221) is used.

In S701, based on a value of the edge coordinate acquired in (S603), the new edge adding unit specifies a divided area corresponding to the coordinate. For example, when the edge (527) having edge ID=7 is added as illustrated in FIG. 8, since the X coordinate of the edge (527) is 700, the divided area 3 (504) corresponding to the X coordinate range 512 to 767 is specified. In other words, a divided area, in which the edge (527) is to be included, is specified. Similarly, for the edge (528) of edge ID=8, the divided area 4 (505) is specified.

Next, in S702, the new edge adding unit refers to the edge block table (221) and determines whether there is an edge associated with the specified divided area. For example, when there is an edge ID associated with the ID of the divided area in the edge block table, it is determined there is an associated edge (Yes in S702) and the new edge adding unit specifies the associated edge in S703. When it is determined there is not an associated edge, the process proceeds to (S706). For example, in the case of FIG. 8, it is determined that the edge of edge ID=7 is added to the divided area 3 (504) and the edge (521) of edge ID=1 is specified based on the edge block table (221).

Next, in S704, the new edge adding unit updates the edge ID associated with the divided area 3 (504) in the edge block table (221) with edge ID (ID=7), which is currently processed.

Next, in S705, the new edge adding unit searches in the edge table starting with the specified edge. This search is a process to search a position to add the new edge in a link structure by tracing the link structure of the edges managed in the edge table starting from the edge as a starting point. In other words, a comparison between the coordinate of the new edge as a sorting target and a coordinate of another edge starts from a comparison with the coordinate of the edge as a starting point. In other words, when one edge is sorted, an edge where the comparison of the coordinate with the sorting target edge is started is specified based on the coordinate of the sorting target edge. In the example of FIG. 8, the new edge adding unit compares the values of the coordinate (Current_X) 600 on the processing target scan line of the specified edge (521) and the coordinate (Current_X) 700 on the processing target scan line of the edge (527) as a processing target. As a result, it can be judged that the edge (527) is located in a rear side (in a rear side in the link structure of the edge table) of the edge (521) with respect to the X coordinate. Next, the new edge adding unit refers to next_edge_id of the edge (521) and specifies an edge (the edge (522) having ID=2). Then, the new edge adding unit compares the values of the coordinate (Current_X) 1200 on the process target scan line processing target of the specified edge (522) and the coordinate (700) of the new edge (527). Then, it can be judged that the new edge (527) is located in front (in a front side of the link structure of the edge table) of the edge (522) with respect to the X coordinate. With the above described processes, the new edge adding unit judges that the new edge (527) is located between the edge (521) and edge (522) and updates the link structure managed in the edge table. More specifically, the new edge adding unit updates next_edge_id of the edge (521) from "ID=2" to "ID=7," and updates prev_edge_id of the edge (527) from "Null" to "ID=1." Further, the new edge adding unit updates next_edge_id of the edge (527) from "Null" to "ID=2" and updates prev_edge_id of the edge (527) from "ID=1" to "ID=7."

On the other hand, in S706, the new edge adding unit associates the edge ID of the new edge to the corresponding divided area in the edge block table. For example, in the example of FIG. 9, it is determined, in S701, that the edge (528) having ID=8 is included in the divided area 4, and the edge having ID=8 is associated to the divided area 4 on the edge block table.

Next, in S707, the new edge adding unit searches the link structure of the edge table and determines which edge the new edge is linked to. In the example of FIG. 9, the edge (528) is an edge included in the divided area 4 (505). Thus, the new edge adding unit determines whether or not there is an edge which is associated with the divided area 3 (504), in which there is an edge to be linked to the new edge (528), in the edge block table. Then, since the edge (527) is associated to the divided area 3 in the edge block table, it is determined that the new edge (528) is linked to the edge included in the divided area 3 (504) and search and update of the edge table are performed, similarly to S705. As a result, the new edge adding unit determines that the new edge (528) is located between the edge (527) and edge (522) and updates the edge table so that the edge (527), edge (528), and edge (522) are linked in order.

As described above, the new edge adding unit specifies an edge associated with the divided area in which the new edge is included, based on the edge block table. Then, by searching the edge table (link structure of the edge) starting with the specified edge, the new edge adding unit specifies a part where the new edge is to be added and updates the edge table. With this process, search and update in the edge table (the link structure of the edge) can be efficiently performed.

<Details of Added Edge Sorting Process (S301)>

Figure 11:
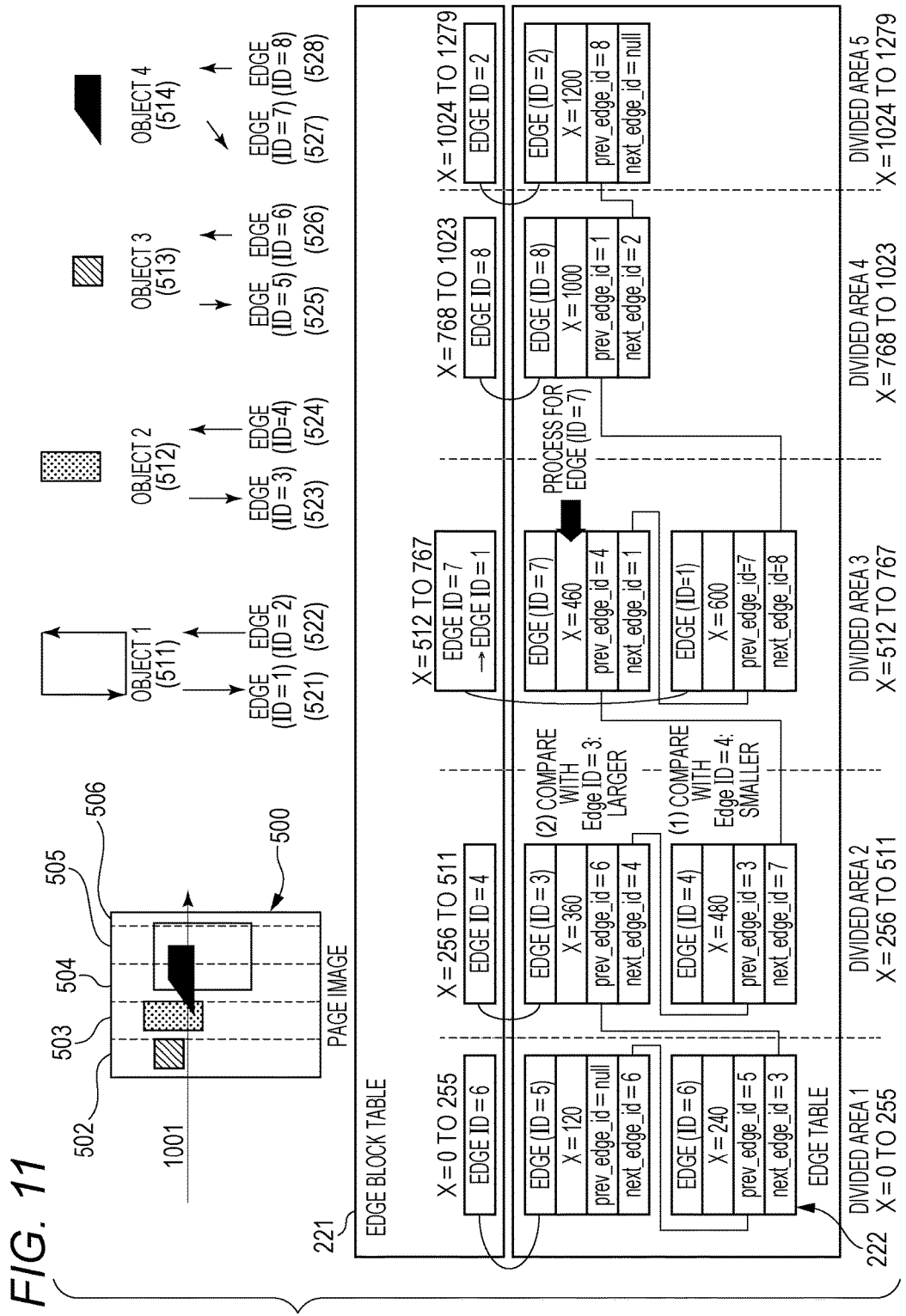
FIG. 11 is a diagram of the added edge sorting process, in which the edge block table is used according to one or more aspects of the present disclosure.

FIG. 10 is a diagram illustrating a detailed flow of the added edge sorting process (S301) illustrated in FIG. 3 according to one or more aspects of the present disclosure. This process is a process to calculate coordinates of edges, which are already managed in the edge table (222), on the process target scan lines and to rearrange, based on the calculated coordinates, respective edges on the process target scan lines in ascending order with the coordinates. FIG. 11 is a diagram for explaining the added edge sorting process (S301) in which the edge block table (221) is used.

In S1001, the added edge sorting unit acquires an unprocessed edge among the edges, which are already managed in the edge table. For example, as illustrated in FIG. 11, a case that the edge (527) is acquired will be described.

In S1002, the added edge sorting unit calculates a coordinate on the process target scan line of the acquired edge. Since a coordinate stored in CurrentX of the edge acquired in (S1001) is an X coordinate on a scan line prior to the process target scan line, a value in which a DX/DY value is added to CurrentX is set as the coordinate on the process target scan line.

Next, in S1003, the added edge sorting unit compares the value of Current_X (the coordinate on the previous scan line, which is a previous coordinate) with the calculated value (the coordinate on the process target scan line, which is a current coordinate). When the values are the same, since a sorting process is not needed for the edge to be processed, the process proceeds to (S1006). When the values are not the same, since the edge sorting process is needed, the process proceeds to S1004. Since, in this process of S1004, the added edge sorting unit executes a process similar to the above described process of S604, the details of the process will be omitted. In the example of FIG. 11, with the process of S1004, the divided area 3 in which the edge (527) is included is specified, and search and update in the edge table are performed starting with the edge associated with the divided area 3 in the edge block table.

Next, in S1005, the added edge sorting unit refers to the previous coordinate and current coordinate, and determines whether the edge shifts between the divided areas. When the previous coordinate and current coordinate correspond to different divided areas, it is determined that the edge shifts between the divided areas and the process proceeds to S1006 and, when the previous coordinate and current coordinate correspond to the same divided areas, the process proceeds to S1007. In the example of FIG. 11, it is determined that the edge (527) shifts from the divided area 3 (504) to the divided area 2 (503).

In S1006, the added edge sorting unit updates the edge block table. In this update, the ID of the process target edge (the edge 7 in the example of FIG. 11), which is judged to shift between the divided areas, is associated with the divided area as a shifting destination (the divided area 2 in the example of FIG. 11) in the edge block table. And, in this update, the ID (ID=1) indicated by next_edge_id of the process target edge (the edge 7 in the example of FIG. 11) is associated to the divided area as the shifting source (the divided area 3 in the example of FIG. 11) in the edge block table. Here, when an anteroposterior relation of the divided areas as the shifting source and shifting destination with respect to the X coordinate is opposite, in this update, the ID indicated by prev_edge_id of the process target edge is associated with the divided area as the shifting source in the edge block table.

Then, in S1007, when there is no more unprocessed edge (Yes in S1007), the added edge sorting unit ends the process and, when an unprocessed edge is found, the process returns to S1001.

As described above, the image processing apparatus according to the present embodiment can divide the above described page image into predetermined divided areas, and realizes the addition process and sorting process of the edges by using the edge block table (221) that manages pieces of edge information respectively belonging to the divided areas. In other words, the edge where the comparison of the coordinate with the edge as the sorting target is started is specified based on the coordinate of the edge as the sorting target. With this configuration, the image forming process, especially, a process of an edge indicating an outline of an object to be drawn (especially search and update in the edge table) can be realized at high speeds.

Second Embodiment

In the following, a second embodiment will be described.

<Conceptual Diagram of Edge Block Table 1 (223) and Edge Table 2 (224)>

FIG. 12 is a conceptual diagram of two edge block tables 1 and 2 (223 and 224) and an edge table (222) according to one or more aspects of the present disclosure. The second embodiment uses two edge block tables 1 and 2 (223 and 224) which have different divided sizes of divided areas. The edge block table 1 (223) is a table that manages edge IDs in the above described unit of divided areas (which is a unit of a divided size of 256 pixels). As the role of the edge block table 1 (223) is the same as that of the edge block table (221) according to the first embodiment. Next, the edge block table 2 (224) is a table that manages the edges based on coordinates (a unit of pixel). For example, to coordinate ID=120 (that is, X coordinate=120), edge ID=5 is associated. It is noted here that there may be more than one edges in X coordinate=120. As described later, when the edges are managed based on the coordinates, a search range of edge data can be focused, when adding a new edge or sorting added edge, more efficiently compared to the first embodiment. An example of utilization will be described later with reference to FIG. 13.

<Flow Diagram Illustrating Details of Divided Area Sorting Process (S604) According to Second Embodiment>

Figure 13:
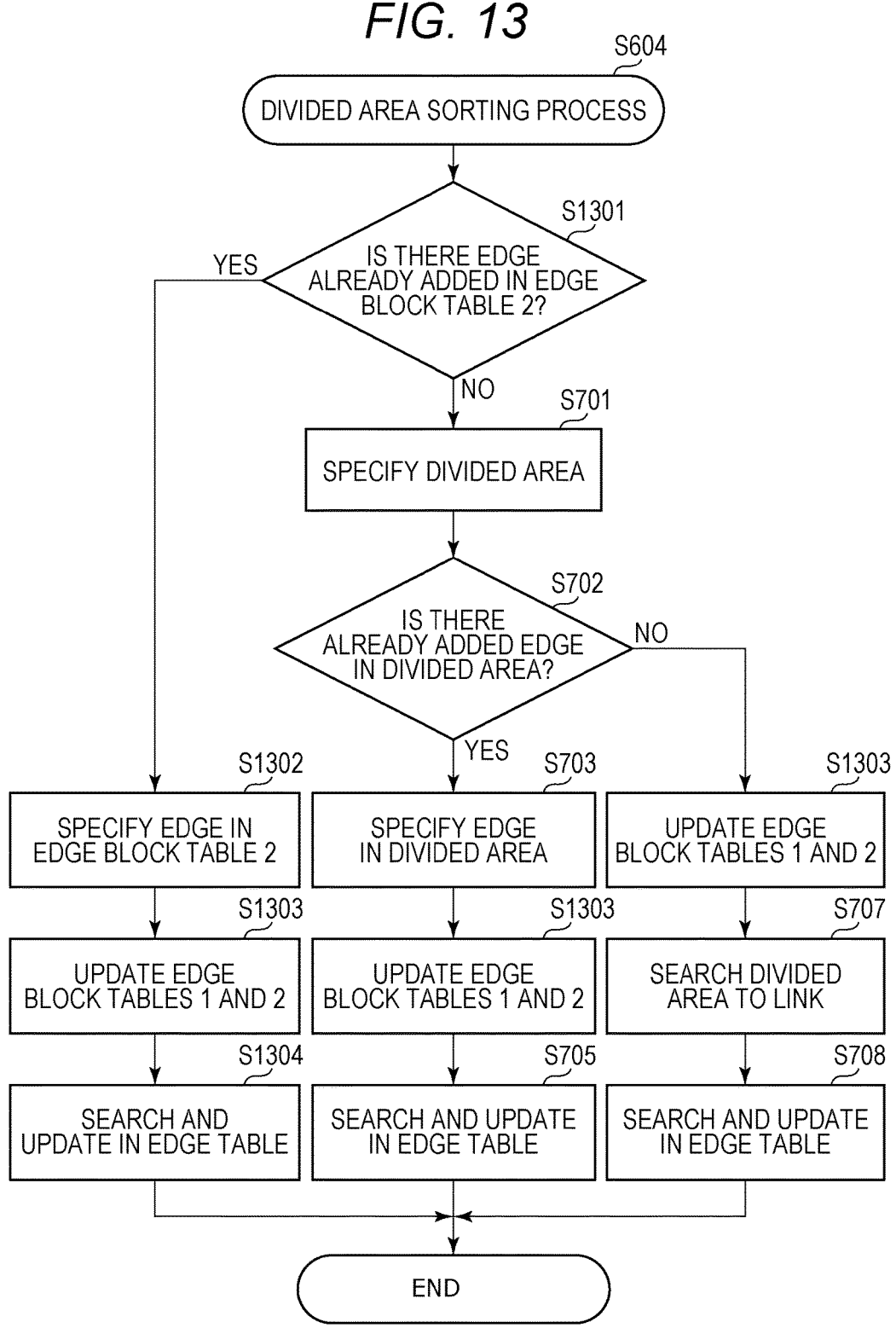
FIG. 13 is a flow diagram illustrating details of a divided area sorting process, in which the edge block tables 1 and 2 are used according to one or more aspects of the present disclosure.

FIG. 13 is a flow diagram illustrating details of a divided area sorting process (S604) according to one or more aspects of the present disclosure, in which two edge block tables 1 and 2 (223 and 224) according to the present embodiment are used. Similarly to the first embodiment, before starting this process, the coordinate of the process target edge is acquired.

Firstly, in S1301, the new edge adding unit determines whether or not there is an edge, which is associated with a coordinate ID corresponding to the acquired coordinate based on the edge block table 2 (224). When an edge is found, the process proceeds to S1302. When an edge is not found, the process proceeds to S701. This process is the same as S701 in the first embodiment and processes subsequent to this step are almost same as those in FIG. 7. The difference is a later described process in S1303.

Next, in S1302, an edge, which is associated with the coordinate ID in the edge block table 2 in (S1301), is specified.

Next, in S1303, the new edge adding unit updates both the edge block tables 1 and 2 (223 and 224) with the process target edge (new edge). The new edge adding unit updates the edge block table 2 (224) so as to associate the edge with the coordinate ID corresponding to the coordinate of the process target edge. Further, the new edge adding unit updates the edge block table 1 (223) so as to associate the edge with a divided area corresponding to the coordinate of the acquired edge.

In S1304, the new edge adding unit performs search and update in the edge table, similarly to S705, starting with the edge specified in S1302.

As described above, by using the coordinate-based edge block table, search and update in the edge table can be efficiently performed by the processes from S1302 to S1304.

According to the present disclosure, a sorting process of edges of an object can be performed at high speeds.

Other Embodiments

The present disclosure may be realized by a process in which a program that realizes functions of the above one or more embodiments is provided to the system or a device via a network or a storage medium, and one or more processors in a computer of the system or device read and execute the program. Further, the present disclosure may also be realized by a circuit (for example, ASIC) that realizes one or more of the functions.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2016-201255, filed Oct. 12, 2016, which is hereby incorporated by reference herein in its entirety.

What is claimed is:

1. An image forming apparatus comprising:
a memory device that stores a set of instructions;
at least one processor that executes the set of instructions to:
acquire print data;
generate intermediate data based on the acquired print data, wherein the intermediate data includes information of edges of one or more objects;
manage information indicating identification information of one or more edges included in a section of a plurality of sections on a process line;
a raster image processor configured to generate bitmap data based on the generated intermediate data, wherein the raster image processor includes one or more processors, an electronic circuits or a combination of one or more processors and an electronic circuit;
wherein the at least one processor or the raster image processor is further configured to:
perform a sorting process, based on the intermediate data and the managed information indicating the identification information of the one or more edges included in the section, to arrange edges of objects on a process target line in an ascending order of coordinates; and
perform drawing of objects which are defined by two or more edges based on the edges arranged in accordance with a result of the sorting process of edges.

2. The image forming apparatus according to claim 1, wherein the information indicating the identification information of the one or more edges included in the section is updated in a case where the sorting process is performed.

3. The image forming apparatus according to claim 1, wherein the information is to specify an edge which is lastly accessed among the edges included in the respective sections.

4. The image forming apparatus according to claim 1, wherein the information is to specify an edge at an end included in the respective sections.

5. The image forming apparatus according to claim 1, wherein a process target line is divided into sections in a unit of plural pixels.

6. The image forming apparatus according to claim 1, wherein a process target line is divided into sections in a unit of pixel.

7. The image forming apparatus according to claim 1, wherein the at least one processor or the raster image processor is further configured to;
perform the sorting process for one edge indicated by the intermediate data by comparing the coordinate of the one edge with coordinates of one or more edges which are already sorted and are included in one section.

8. A method for drawing an object included in a page, the method comprising:
by at least one processor executing a set of instructions stored in a memory device,
acquiring print data;
generating intermediate data based on the acquired print data, wherein the intermediate data includes information of edges of one or more objects;

managing information indicating identification information of one or more edges included in a section of a plurality of sections on a process line;

by a raster image processor, generating bitmap data based on the generated intermediate data, wherein the raster image processor includes one or more processors, an electronic circuits or a combination of one or more processors and an electronic circuit;

wherein by the at least one processor or by the raster image processor, a sorting process is performed based on the intermediate data and the managed information indicating the identification information of the one or more edges included in the section, to arrange edges of objects on a process target line in an ascending order of coordinates; and a drawing of objects which are defined by two or more edges is performed based on the edges arranged in accordance with a result of the sorting process of edges.

9. The method according to claim 8, wherein the information is updated when the process target line is changed.

10. The method according to claim 8, wherein the managed information is to specify an edge which is lastly accessed among the edges included in the respective sections.

11. The method according to claim 8, wherein the managed information is to specify an edge at an end included in the respective sections.

12. The method according to claim 8, wherein a process target line is divided into sections in a unit of plural pixels.

13. The method according to claim 8, wherein a process target line is divided into sections in a unit of pixel.

14. A non-transitory storage medium storing a program that causes a computer to execute a method for drawing line by line an object included in a page, the method comprising:

acquiring print data;

generating intermediate data based on the acquired print data, wherein the intermediate data includes information of edges of one or more objects;

managing information indicating identification information of one or more edges included in a section of a plurality of sections on a process line;

generating bitmap data based on the generated intermediate data, wherein a sorting process is performed based on the intermediate data and the managed information indicating the identification information of the one or more edges included in the section, to arrange edges of objects on a process target line in an ascending order of coordinates; and a drawing of objects which are defined by two or more edges is performed based on the edges arranged in accordance with a result of the sorting process of edges.

* * * * *